Sept. 27, 1960    W. T. RENTSCHLER    2,953,978
PHOTOGRAPHIC CAMERA
Filed May 6, 1957    2 Sheets-Sheet 1
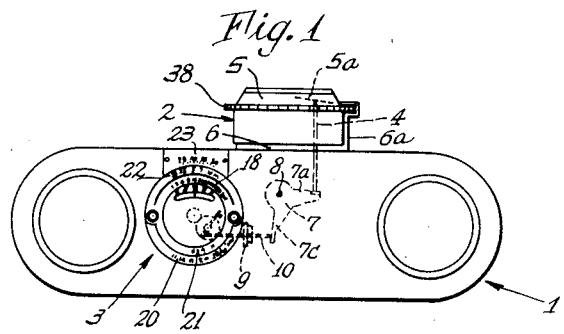
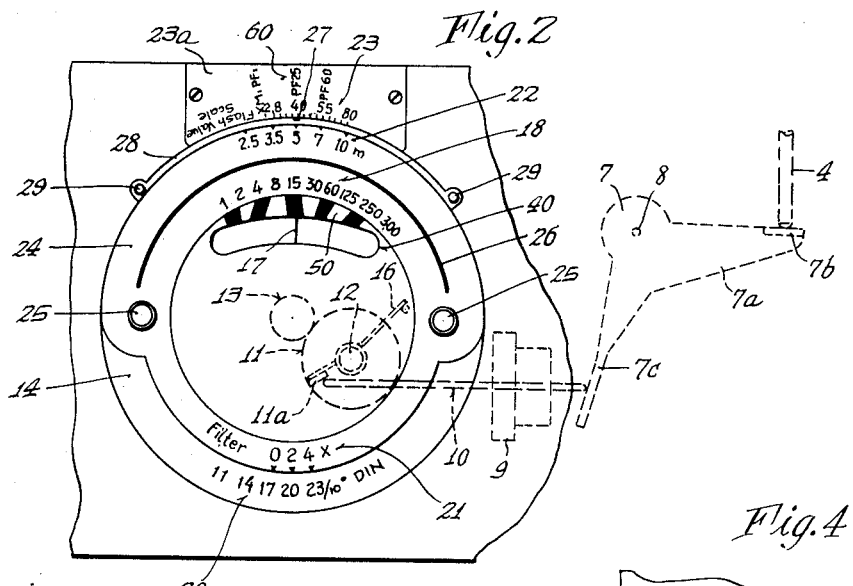
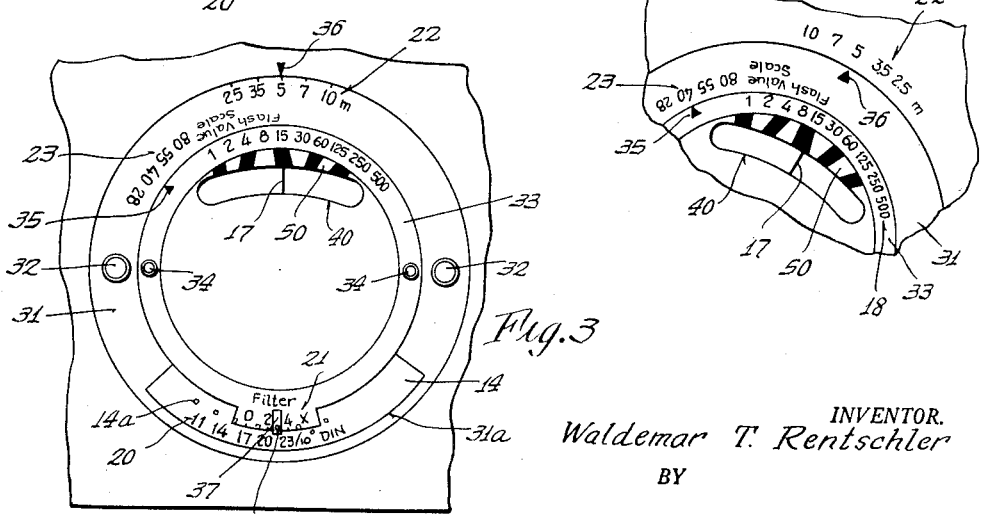
INVENTOR.
Waldemar T. Rentschler
BY
Munn, Liddy, Daniels & March
ATTORNEYS Sept. 27, 1960  W. T. RENTSCHLER  2,953,978
PHOTOGRAPHIC CAMERA Filed May 6, 1957  2 Sheets-Sheet 2

INVENTOR.
Waldemar T. Rentschler
BY
Munn, Liddy, Daniels & March
ATTORNEYS

United States Patent Office 2,953,978
Patented Sept. 27, 1960

2,953,978
PHOTOGRAPHIC CAMERA

Waldemar T. Rentschler, Calmbach (Enz), Germany, assignor to Alfred Gauthier G.m.b.H., Calmbach (Enz), Germany, a corporation of Germany Filed May 6, 1957, Ser. No. 657,376

Claims priority, application Germany May 15, 1956

14 Claims. (Cl. 95—10)

This invention relates to photographic cameras of the type having setting members which are coupled with the tracing member of an exposure meter for the purpose of obtaining semi-automatic camera settings, such setting members for example, being those arranged to adjust the exposure value or the diaphragm of the camera.

Cameras of the above type, having coupled setting members and exposure meters, make it possible to easily and quickly effect the proper camera adjustments before taking a picture, in situations where the light conditions may be readily ascertained beforehand by the exposure meter.

However, in these prior cameras advantage could not be taken of the semiautomatic setting organization for conditions where the light will vary before or during the taking of the picture, as for example when flash exposures are to be made, using flash bulbs.

An object of the present invention is to provide a novel and improved camera with semiautomatic mechanism for adjusting the various factors involved in taking pictures, such camera and mechanism being especially adapted for use in connection with flash exposures.

A feature of the invention resides in the provision of a novel and improved camera and adjustment mechanism as above set forth, wherein the factors of distance, shutter speed, diaphragm opening, and types of flash lamps may be all quickly and readily coordinated with the object of effecting a proper camera setting for flash exposures.

In accordance with the invention, the above is accomplished in part by the provision of a distance scale on the camera, and an indication-mark scale (hereinafter also called a flash-value scale) giving various types of flash lamps or flash light values, such scales being made relatively movable. Optionally, either one of the said scales may be fixedly mounted, as for example on the camera casing, and the other scale made movable and located adjacent the tracing member of the exposure meter. Or, as an alternative, both scales may be located at the tracing member and made movable. In any circumstance, the scales are made cooperable with each other either directly or through some suitable intermediary device, to enable adjustment of the tracing member of the exposure meter to be made in accordance with determinate conditions or factors, thereby as a consequence to effect adjustment of the camera aperture or other adjustable device in coordination with the type of flash lamp used and the distance which has been selected.

As another example, an index mark optionally arranged either at the tracing member or else fixedly mounted, may be made to cooperate with one of the above scales, such one scale being either fixed or movable adjacent the tracing member, depending on the movable or fixed condition of the said index mark.

The above organizations, and the advantages resulting therefrom are illustrated herein and described, in connection with specific embodiments of the invention, reference being had to the accompanying drawings, in which:

Figure 1 is a top or plan view, executed to some extent in outline form, illustrating a photographic camera with intra-lens shutter and incorporated exposure meter, the latter having a tracing member mechanically coupled to the aperture setting member of the shutter. For enabling semiautomatic adjustment of the camera to be made for flash exposures, the invention provides at the tracing member and also fixedly mounted a distance scale and an indication mark or flash-value scale, the latter giving values or designations for different types of flash lamps.

Fig. 2 is an enlarged fragmentary plan view and in part a schematic representation, of the exposure meter and coupling means of the camera of Fig. 1. Illustrated are distance and flash-value scales, and interposed therebetween and carried on a fixed support is a shiftable setting mark, or index to which both scales may be referred.

Fig. 3 is an enlarged top view of a portion of an exposure meter, illustrating a form of tracing member different from that shown in Fig. 2.

Fig. 4 is a fragmentary view, enlarged, of an exposure meter somewhat similar to that shown in Fig. 3, but illustrating in modified form the scales and cooperable setting marks.

Figure 6:
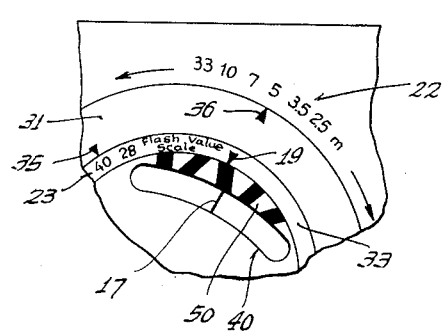

Fig. 6. is a fragmentary top view, enlarged, of an exposure meter illustrating yet another embodiment of the invention embracing a distance scale and a flash-value scale.

Figure 7:
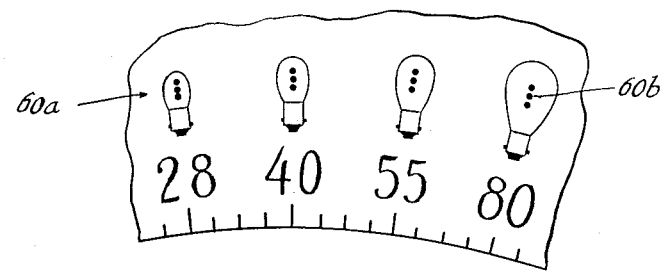

Fig. 7 is a diagrammatic representation, enlarged, of a flash-value scale as provided by the invention.

Referring first to Figs. 1 and 2 there is illustrated a camera having a housing or a casing 1 and a well-known type of intra-lens shutter 2. The camera further is provided with an exposure meter designated generally by the numeral 3.

For the purpose of coupling the exposure meter with the shutter there is provided an axially-movable, cylindrical pin 4 shiftable in a direction parallel to the axis of the shutter 2, such pin being actuated by a cam 5a carried by a settable ring 5 which is supported at the front of the shutter. Turning of the ring 5 will thus effect axial movement of the pin 4. The ring 5 may be coupled to an aperture setting ring 6 disposed at the rear of the shutter, by means of a connecting arm 6a such that simultaneous turning movement of the rings 5 and 6 will take place.

While in Fig. 1 the ring 5 is illustrated as coupled to an aperture setting ring, it will be understood that it may instead be coupled to an exposure value setting member, which is connected with the setting members for aperture and speed.

The axial movement of the pin 4 is utilized in conjunction with the tracing member of the exposure meter, by providing an angular lever or bell crank 7 carried by the camera casing 1 on a fixed axis 8. The lever 7 has an arm 7a provided with a bent lug or pad 7b engageable with one end of the pin 4. Also, the lever 7 has an arm 7c engaging one end of an axially movable pin 10 shiftable in a guide bushing 9 mounted on the camera casing. The other end of the pin 10 engages a stop or abutment 11a of a gear 11 which is mounted on a shaft 12 and which drivingly engages a pinion 13 fixed to a turnable disk or plate 14, also hereinafter called a carrier member in the claims. A wire coil spring 16 on the shaft 12 normally urges the gear 11 counterclockwise, as seen in Fig. 2, thereby to maintain the pins 4 and 10 in engagement with the cam 5a, lever 7, and abutment 11a.

The disk 14 is provided with a speed scale 18, also hereinafter called indicia means in the claims, which is coopable with an indicator or pointer 17 of the exposure meter measuring device, such pointer being visible through a window 40 in the disk.

Instead of the scale 18 on the disk 14 I may provide a single index mark 19, Fig. 6, for reference with the pointer 17.

For the purpose of obtaining insofar as possible a linear exposure setting, where the exposure meter has a non-logarithmic characteristic, there is provided between the window 40 and the scale 18 or the mark 19, a well-known channel scale 50. The scale 18 or the index mark 19 is movable with respect to the disk 14, as will be later more fully described, and the disk 14 is hereinafter also referred to as a carrier member, said disk constituting a part of the exposure meter tracing member.

In accordance with the present invention I provide a pair of relatively movable scales, namely a distance scale 22 and an indication mark or flash-value scale 23 (giving flash lamp types or values) for the purpose of enabling semiautomatic setting of the camera aperture for flash exposures, in accordance with various types of flash lamps, and speed and distance requirements. Optionally either one of the scales 22, 23 may be fixed or mounted on a fixed support with the other one located adjacent the exposure tracing member comprising the disk 14 and scale 18, or both the scales 22 and 23 may be arranged at the tracing member.

For the purpose of setting the tracing member of the exposure meter, and thus setting the aperture to a value corresponding with the flash lamp type and distance selected, the scale 18 is made cooperable with one of the scales 22, 23, such one scale being firmly mounted, or else cooperable with an index mark optionally provided at the tracing member or else firmly mounted, such mark in turn either directly or by an intermediate means being cooperable with one of the scales 22, 23.

For the purpose of including in the setting the additional exposure factors of film sensibility and filter values, as well as other multiplication factors, the tracing member of the exposure meter is made to consist of at least two relatively movable parts, one such part being the carrier member 14 already mentioned, which as above explained is coupled with the aperture or exposure value setting member of the intra-lens shutter. The carrier member 14 carries a relatively movable part or indicia member 24, shown as a ring, on which the scale 18 is provided. The carrier disk 14 may also be provided with a film sensibility scale 20, and cooperable with such scale there may be provided on the ring 24 a filter factor scale 21. The ring 24 may also carry one of the scales 22, 23, it being shown as carrying the scale 22, in Fig. 2, and as carrying the scale 23 in Fig. 5.

In the various embodiments of the invention illustrated herein the flash-value scale 23 is given well known guide numbers, such numbers for example being obtained by multiplying the aperture value by the distance (in meters) for a film sensibility of 17/10 DIN.

In addition, the scale 23 may carry designations of different types of flash lamps, as indicated at 60 in Fig. 2. These designations may be in addition to the flash value numbers, thereby to facilitate insofar as possible a quick and accurate adjustment for different types of flash lamps. By the provision of the flash-value numbers, correct adjustment may be effected for lamps not indicated as to type but where specifications are given as to light values, and thus the scale 23 will be useful for other types of lamps which may be introduced on the market at a later date, even though the type numbers do not appear on the scale.

Moreover, the flash value scale 23 could additionally comprise symbols of different shapes and/or colors, and one such organization is illustrated by way of example in Fig. 7, wherein different lamp envelope shapes 60a are depicted. The designations 60a may represent small and large flash lamps, and depending on their use for black and white or color film, the lamps may have different colors, or colored dots 60b may be shown, arranged in different sequences to provide desired indications.

Figure 5:
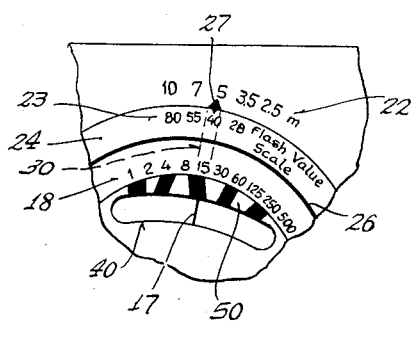
Fig. 5 is a fragmentary view, enlarged, of an exposure meter similar to that of Fig. 2, but illustrating yet another embodiment of the invention, wherein there is provided a shiftable setting or index mark at the tracing member, movable between the distance scale and the flash-value scale.

In the embodiments of the invention illustrated in Figs. 1, 2 and 5 the structure of the tracing member has been arranged in a very simple form, found to be compact and saving of space, by the provision of only two relatively movable parts, the disk 14 and the ring 24. The said ring may be provided with a pair of finger engageable pins 25, to facilitate its adjustment with respect to the disk 14, and as already stated, the ring 24 may have the filter factor scale 21 and also the speed scale 18, the filter factor scale constituting a reference means cooperating with the film sensibility scale 20 on the disk 14 and the speed scale being referrable to the pointer 17 of the measuring device, as seen through the window 40.

In Figs. 1 and 2 the ring 24 is shown as also provided with the distance scale 22, cooperable with the flash value scale 23, the latter being fixed on the casing 1 of the camera. For economy of manufacture and convenience in interchangeability, the flash-value scale 23 may be provided on a separate plate 23a affixed to the casing 1 by suitable screws, as shown.

In accordance with this invention, the scales 22 and 23 may also be reversely arranged, as shown in Fig. 5. Here the flash-value scale 23 is carried by the rings 24, whereas the distance scale 22 is fixed on the camera casing 1. For the sake of clarity in reading and use, the scales 22 and 23 may be separated from the speed scale 18 by a heavy separation line 26, as shown.

In a like manner, as with the scales 22 and 23, there is also possible a free selection or variation of the scales 20 and 21, as concerns the parts 14 and 24, to the end that the best possible clarity and facility of reading is obtained, with the particular camera structure involved.

Also, as clearly shown in Fig. 2, the scale 23 may be provided with suitable graduation lines extending toward the scale 22 to facilitate reading and adjustment of the scales.

In the embodiments of the invention illustrated in Figs. 2 and 5 I have provided further a shiftable index means or auxiliary mark 27, disposed between the scales 22 and 23 to facilitate the adjustment procedure. In Fig. 2, the auxiliary or index mark 27 is mounted on an arcuate member 28 extending between the scales 22 and 23, such member being shiftable on the camera casing 1 and having finger-engageable pins 29 to facilitate its adjustment.

Fig. 5 illustrates another construction by which the index means or mark 27 may be provided, to facilitate setting of the scales 22, 23. The mark 27 in this figure is carried by the disk 14 of the tracing member, and is movable with respect to the same. The mark may be arranged at the tip of a pointer or arm 30 pivoted on or about the shaft which carries the disk 14 and the pinion 13.

Other embodiments of the invention are illustrated in Figs. 3, 4 and 6, such embodiments being different from those described above. For example, in these different embodiments the tracing member of the exposure meter may have three relatively movable parts instead of two, one of such parts being again represented by the carrier member or disk 14 which is coupled to the aperture or exposure value setting ring of the intra-lens shutter 2. Moreover, the two remaining relatively movable parts of the tracing member may be constituted as rings 31, 33 by which a very compact and space-saving arrangement is effected, as well as a favorable or advantageous organization of the various scales and setting or index marks, as regards simplicity of mechanical structures and economy of space.

For the purpose of enabling the rings 31 and 33 to be readily shifted with respect to the carrier member 14, such rings may be provided with finger-engageable pins 32 and 34, as shown in Fig. 3. Also, the ring 31 may have a recess or a window 31a through which the film sensibility scale 20 may be viewed, such sensibility scale being now cooperable with a filter factor scale 21 carried by the inner ring 33.

The structures as set forth in Figs. 3, 4 and 6 are advantageous in providing for a greater clarity and an easier operation and understanding of the scales. For one reason, this results from the fact that the distance scale 22 and the flash-value scale 23 are each coordinated with a separate and individual index mark, instead of being cooperable one scale with the other. Thus, an easier and quicker setting may be effected by a person of nontechnical turn of mind. It will be observed that one of the scales and one index mark are associated with the rings 31 and 33, which are relatively movable on the carrier disk 14, whereas the other scale and another index mark are associated with the ring 31 (which is not cooperable with the pointer 17), and with the casing 1 of the camera.

In Figs. 3, 4 and 6 it will be seen that the flash-value scale 23 and index means or mark 35 are carried by the rings 31 and 33 while the distance scale 22 and an index means or mark 36 are carried by the ring 31 and a stationary support, in this case the camera housing 1. Preferably, the scale 23 is provided on the ring 31, and the index mark 35 provided on the inner ring 33, although the reverse of this arrangement may be employed, and such reversal is indicated in Fig. 6. In this figure the ring 33 has the scale 23, and the ring 31 has the index mark 35.

By this organization there is avoided in Figs. 3 and 4 the provision of two scales on the inner ring 33, which ring is of course intended for cooperation with the pointer 17 of the measuring device. Also, in Fig. 6 there is avoided the provision of two index marks on the inner ring 33. Instead, such ring carries only the index mark 19 for reference to the needle 17, whereas the outer ring 31 carries the index mark 35, for reference to the scale 23 of the ring 33. It is thus seen that even though the organization is very compact and saving of space, there is still maintained a desirable separateness of the scales and excellent readability.

Desirable clarity may also be obtained by the arrangement of the distance scale 22 and its index mark as illustrated in Figs. 4 and 6. Here, the distance scale 22 is fixedly carried by the camera casing 1, whereas the outer ring 31 mounts the index mark 36 which is cooperable with the scale 22.

In Fig. 3 the distance scale 22 and the index mark 36 therefor have been arranged in a reverse manner, as regards the arrangement of Figs. 4 and 6, and the organization shown in Fig. 3 is of advantage where there is not sufficient space on the camera casing for the provision thereon of the scale 22 in sufficiently large size. Also, the Fig. 3 organization is economical in production, since there is no necessity for providing numbers on the casing, and since all of the scales, numbers, symbols, etc., may be provided on separate rings 31 and 33 through a suitable etching process. Thus, only the index mark 33 need be placed on the camera housing or casing 1.

For the purpose of locking the ring 33 in its adjusted position with respect to the carrier disk 14, I provide a notched device comprising a spring loaded arm 37 mounted on the ring 33 and having at its free end a pin 70 receivable in slots 14a provided in the carrier disk 14, such slots being coordinated to the film sensibility scale 20. Thus there is prevented any inadvertent shifting of the ring 33 when adjusting the outer ring 31 for the purpose of effecting a new camera setting.

After effecting preadjustment for the film sensibility, semi-automatic aperture setting for flash exposure is effected as follows, in accordance with this invention:

By means of the speed setting member at the shutter 2, shown in Fig. 1 as the knurled ring 38, first those speeds are adjusted which are suitable for the flash lamp being used, to which the flash-value scale 23 refers. For flash lamps and X-synchronization of the shutter, there is for instance, an indication of 1/30 sec., whereas with the use of an electronic flash device any speed may be utilized. By means of the auxiliary mark 27, or by means of the mark 35, the type of flash lamp which is to be used is inindicated on the flash-value scale 23. By virtue of the absence, in Fig. 1, of the shiftable arcuate member 28 or other similar device, such presetting is not possible in the Fig. 1 structure. Other illustrated embodiments of the invention may be set, however, with this procedure.

Now, the aperture or exposure value setting member of the shutter 2 is turned until the proper distance value on the scale 22 is brought to the index mark 27 (Figs. 2 and 5) or to the index mark 36 (Figs. 3, 4 and 6), or to the flash-value of the particular flash lamp being used, as found on the scale 23 (Fig. 1).

If, in the case of a flash exposure, a film is used having a sensibility different from the one previously adjusted, this is of course taken into consideration by setting the new sensibility at the exposure meter.

In the embodiment of the invention illustrated in Figs. 1 and 2, the new film sensibility is adjusted by turning the ring 24 until the factor "0" of the scale 21 is opposite to the sensibility number of the scale 20, corresponding to new film being used.

In the embodiment of the invention illustrated in Fig. 3 it is first necessary, when setting for film sensibility, to loosen the notched device 14a, 37 which connects the carrier disk 14 with the ring 33. This is effected by lifting the spring arm 37 away from the slots 14a. The ring 33 is then turned until the factor "0" of the scale 21 is opposite to the proper sensibility number on the scale 20. After completing this, the spring arm 37 is released, so that the pin 70 thereof may engage a new one of the slots 14a.

As soon as the new film sensibility has been taken care of in the above manner, the semiautomatic setting of the aperture will be effected in a manner similar to that given above.

It has been already mentioned that, in the case of using flash lamps, the flash-value scale 23 is based on a certain speed for X-synchronized shutters, the usual speed being 1/25 sec. or 1/30 sec. If, however, the device of this invention is used in connection with fully synchronized shutters and the semiautomatic adjustment of the aperture is to be made with speeds of less than 1/30 sec., those other speeds could be taken into consideration by a relative displacement of the indication mark or distance scale respectively, with respect to the carrier disk 14. This could be done in a manner similar to the adjustment for filter factors. For example, the scale 21 indicates different filter factors, and a change in the setting of the member carrying the scale 21, with respect to the carrier disc 14 would provide the desired result. Or, it would be possible to provide instead of one flash-value scale 23, a number of such scales, each bearing reference to a particular speed, and the different scales could be provided in different colors, as well as their respective index marks. In this latter case, the corresponding speed values could be obtained by using reference marks bearing the same color.

A brief summary of the method of effecting the settings, in the camera of the present invention, is as follows:

(a) *Semi-automatic diaphragm setting utilizing the exposure meter indication*

This mode of setting the camera is used when, prior to taking the picture, the normal or existing light relating to the picture is measured by means of an exposure meter, as with daylight pictures. The setting of a speed-diaphragm proportion corresponding to the exposure meter indication is effected, (after first having set the film sensitivity) by adjusting the speed setting ring 38 at the shutter to the desired shutter speed. Then the diaphragm setting ring 6, which is drivingly connected with the follower member 14 of the exposure meter, is turned until the proper number of the scale 18 (which corresponds to the selected speed adjusted at the shutter) is opposite the measuring device pointer 17. By this action the diaphragm value, which is coordinated to the preselected speed and to the sensitivity of the film used, is automatically adjusted at the shutter.

*(b) Semi-automatic diaphragm setting for use with a flash exposure*

With exposures of this kind, the exposure meter indication is not utilized for the diaphragm setting, but instead the illumination factor or light intensity of the flash lamp and the distance between the subject and the flash lamp is utilized.

The shutter speed which is to be used with these exposures, on the one hand depends on the kind of flash used (flash lamp or electronic flash) and on the other hand depends on the synchronization possibilities of the shutter (X-synchronization or full synchronization). When using flash lamps with X-synchronization the fastest speed to be used is, for instance, 1/30 sec., whereas when using electronic flashes, due to the light being delivered immediately after contact closure and without delay, any speed may be used. Where, however, the shutter is fully synchronized, speeds of any degree may be used also with combustion flashes.

Accordingly, in the case of this semi-automatic diaphragm setting for flash exposures, a speed is adjusted which corresponds to the flash lamp type used (as set forth on the flash-value scale 23) as well as to the required synchronization, the latter being selected by means of the speed setting ring 38. Then by means of the auxiliary mark 27 or the mark 35 the flash lamp type to be used is adjusted for, at the marking scale 23. For setting the diaphragm value coordinated to the intensity of the flash lamp used and to the distance of the subject to be photographed, the diaphragm setting member 6 is turned until the number on the distance scale 22 which corresponds to the distance is opposite the auxiliary mark 27 (Figs. 2 and 5) or the mark 36 (Figs. 3, 4 and 6) or proper mark on the flash-value scale 23 (Fig. 1). As when setting with the exposure meter for daylight exposures, the film put into the camera is taken into consideration by initial use of the film sensitivity scale.

For the purpose of enabling the flash-value scale 20 to be kept up to date, as regards development of newer types of flash lamps having increased efficiency even though the type numbers are not changed, the plate 23 may be removed and replaced by another plate, having a revised scale and revised indicia. Thus, the device of this invention is not necessarily outmoded by the development of newer or different flash lamps, and it would be a simple matter for the user of the camera to exchange his old plate 23a for a new one, when this becomes necessary.

The present invention has utility in connection with all cameras where the tracing member of an exposure meter is coupled with an exposure value or aperture setting member. Moreover, improvements in the couplings between the tracing member and the settable means of the shutter will still enable the device of the present to be used with advantage, thereby to adapt the camera for both daylight picture taking and picture taking involving flash bulbs. The matter of adjustment and sensibility of the film is done jointly for both daylight and flash exposures, in but a single setting operation.

With the improved device of the present invention, the setting members for aperture and speed may be releasably coupled to each other by means of a well-known coupling device. For the purpose of providing maximum simplicity and freedom of movement in the setting operations, it is advantageous, as accomplished by this invention, to provide the releasable coupling in a well-known manner such that the uncoupled condition of the setting members for speed and aperture may be maintained without requiring the application of continuous force or pressure on the part of the user of the camera.

Variations and modifications may be made within the scope of the claims, and portions of the improvements may be used without others.

I claim:

1. In a camera, in combination; a casing; an exposure meter carried on the casing, having a pointer and a movable tracing member cooperable with said pointer, said tracing member having indicia means adapted to be individually brought into coincidence with the said pointer when the tracing member comprising a carrier member and an indicator member movably carried by the carrier member and adjustable with respect thereto; a pair of setting members on the casing, for adjusting for shutter speed and diaphragm opening of the camera respectively; means coupling said tracing member and one of the said pair of setting members for simultaneous movement; indicator means on said tracing member and casing and including a flash value scale and a distance scale at least one of which scales is carried on the indicator member for indicating settings of the tracing member with respect to the casing whereby the factors of flash intensity and distance may be taken into account semi-automatically by actuation of the said coupled setting member to shift the tracing member to a position on the casing determined by the distance of the subject and the said distance scale, said indicia means having data referring to the positioning of the other of the said pair of setting members whereby when one datum thereof specifying the existing setting of the other setting member is brought into coincidence with the pointer of the exposure meter by actuation of the coupled setting member and consequent shifting of the tracing member there is effected a proper positioning of the coupled setting member with respect to the said other setting member for the taking of daylight pictures.

2. The invention as defined in claim 1, in which there is a film sensibility scale means and cooperable reference means for the film sensibility scale means, carried by the carrier member and indicator member constituting the said tracing member.

3. The invention as defined in claim 2, in which the other of the said scales is fixed on the casing.

4. The invention as defined in claim 3, in which the distance and flash value scales are juxtaposed and arranged to extend alongside each other, and in which there is a movable index mark cooperable with the said scales, to constitute the reference point for the scales.

5. The invention as defined in claim 4, in which the index mark is movably mounted on the said casing.

6. The invention as defined in claim 4, in which the index mark is disposed adjacent the indicator member and is movable with respect to the same.

7. The invention as defined in claim 2, in which there is an additional indicator member carried by the tracing member and movable with respect to the carrier member and the first-named indicator member, one of said indicator members having one of the scales and the other indicator member having an index mark cooperable with the said one scale, said casing and said one indicator member having the other of the said scales and a second index scale cooperable therewith, said other indicator member having means constituting the sole reference for said pointer.

8. The invention as defined in claim 7, in which the said one indicator member has the other of the said scales and the casing has the said second index mark.

9. The invention as defined in claim 7, in which there is releasable means including a notched device for locking the said other indicator member to the carrier member.

10. The invention as defined in claim 7, in which the said carrier member comprises a turnable plate, and in which the said indicator members are ringlike.

11. The invention as defined in claim 2, in which the carrier member comprises a turnable plate, and in which the said indicator member is ring-like.

12. The invention as defined in claim 1, in which the flash value scale includes symbols representing different flash lamps shapes.

13. The invention as defined in claim 1, in which the flash value scale includes markings having different colors.

14. The invention as defined in claim 1, in which the flash value scale comprises a group of trade names of flash lamps.

References Cited in the file of this patent

UNITED STATES PATENTS

| | | |
|---|---|---|
| 2,213,749 | Strauss | Sept. 3, 1940 |
| 2,247,323 | Tonnies | June 24, 1941 |
| 2,464,559 | Davenport et al. | Mar. 15, 1949 |
| 2,612,091 | Weiss | Sept. 30, 1952 |
| 2,815,171 | Norwood | Dec. 3, 1957 |